April 9, 1929.   J. M. HARGRAVE   1,708,617
CLAMP JAW
Filed Oct. 29, 1927

Inventor
John M. Hargrave
By Wood & Wood
Attorneys

Patented Apr. 9, 1929.

1,708,617

UNITED STATES PATENT OFFICE.

JOHN M. HARGRAVE, OF CINCINNATI, OHIO.

CLAMP JAW.

Application filed October 29, 1927. Serial No. 229,756.

This invention relates to clamp jaws and is particularly directed to a reinforced structure adapted for embodiment in jaws of substantial length.

For certain types of jaws, such as used in "joiners'" clamps, it is necessary to have the work engaging face of the jaw a sufficient distance from the bar on which the jaws slide in order to provide a working clearance for facile handling and clamping of large objects. Due to the substantial length of these jaws, bending and torsional stresses have resulted in considerable deformation unless the construction has been very heavy and the proper metals used. These jaws are formed of various metals, such as cast iron, malleable iron, steel forgings, etc., the better grades of metal being expensive and the cheaper grades necessitating considerable material to provide strength and, therefore, being extremely heavy.

It is an object of this invention to provide a trussed jaw of light construction adapted to withstand deformation such as might otherwise result from bending and torsional stresses produced by heavy clamping pressures.

Another object is the provision of a jaw structure in which the metal is so arranged that the jaw is extremely strong and durable despite the use of less metal or the use of the cheaper grades.

Further objects and advantages will be more fully set forth in the description of the accompanying drawings forming a part of this specification, in which.

Figure 1:
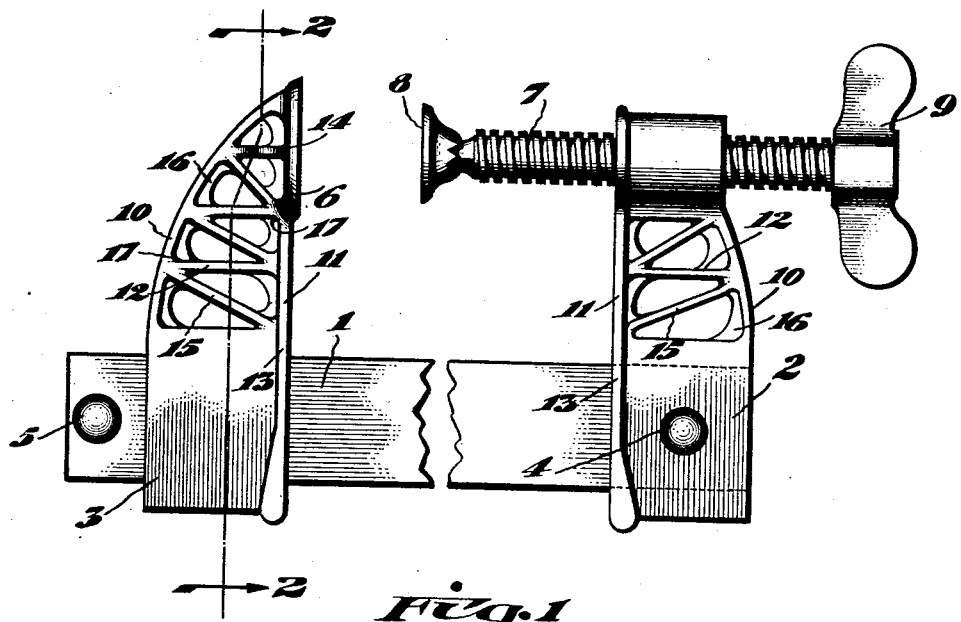
Figure 1 is a side view of an assembled clamp embodying the clamp jaws concerned in the present invention for illustrating the nature and direction of the forces exerted on the jaws.

Referring to the drawings, a longitudinal clamp bar is indicated at 1. A pair of jaws 2, 3 are shown mounted on the bar, the jaw 2 being fixed to the bar by means of a rivet 4 and the jaw 3 being slidable thereon and displacement at the end of the bar prevented by a stop rivet 5. The means involved in frictionally securing the slidable jaw in clamping position is not shown herein inasmuch as this invention is directed purely to the formation of a jaw concerning strength and durability therefor. The relative arrangement of the jaws is also immaterial and both may be slidable if desired.

The bar extending through a bore in one end of the jaw and the work or load forces on the outer end of the jaw cause stresses to be produced in the jaws, it being the objective of the present improvement to prevent any deformation resulting from this relation and these forces with consideration for economy.

The movable jaw has a laterally disposed work engaging face 6 at its upper inner side and the stationary jaw has a screw 7 moving through the outer end thereof parallel to the bar 1. An adjustable face 8 is mounted through a ball and socket arrangement on the end of the screw and opposes the face 6 of the jaw 3, the work being adapted to be clamped between these faces 6, 8. A winged handle 9 is located at the opposite end of the screw 7. With the exception of the outer ends, as far as this invention is concerned, the jaws 2 and 3 are identical. That is to say, the trussing and bracing is the same in both events so that the description will be applied generally.

Figure 2:
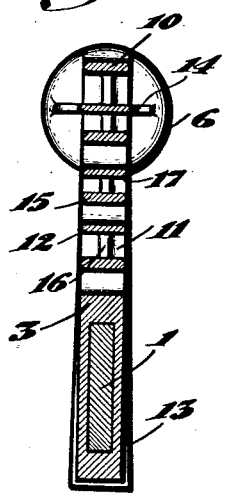
Figure 2 is a sectional view taken on line 2—2, Figure 1, detailing a clamping jaw.

The intermediate portion of a jaw is entirely of ribbed formation, being outlined by the outer wall 10 and inner wall 11, the outer wall converging and joining to the rear side of the work engaging face in the case of the movable jaw and to the outer end of the bore portion in the case of the stationary jaw. The walls 10 and 11 are substantially the same width as the general jaw thickness and are joined by a series of ribs 12 of the same width. The inner wall, however, as shown, is slightly widened to provide a reinforcing bead 13 extending around the clamp jaw. The ribs 12 are equi-spaced and are parallel with the bar engaging bore of the jaw, forming slightly irregular rectangular areas. In the case of the slidable jaws the outermost parallel rib 12 may be widened as shown at 14 (see Figure 2) to join over a greater area at the rear side of the circular work engaging face of the jaw. Diagonally disposed ribs 15 extend across each area and may be likened to struts as far as the arrangement is concerned. In this case, however, as will be hereinafter explained, the diagonal ribs are placed to serve preferably in resisting tensional stresses and in that respect are unlike a true strut. The ribs 12 and 15 are disposed substantially along the line or direction of work thrust, the angle of the diagonally disposed ribs 15 not being great from the ribs 12 because they extend across rectangles, the ribs 12 constituting the long sides of the rectangles. Medially disposed webs 16 are formed at each end of the rectangular box-like areas at right angles to the outer walls and ribs.

As a means for visualizing the manner in which the integrally formed ribbed structure resists the stresses set up by external forces applied to the outer end of the jaw, the action on a single box-like or rectangular area will be noted. The tendency under direct bending, due to a force having no torsional effect but at a direct angle to the laterally extending work engaging face, is to force the corners 17 of the rectangular area together, spreading apart the opposing corners, the diagonal rib resisting this tendency and having a tensional stress set up therein. If the diagonal rib were oppositely diagonal it would act as a strut and there would be a compression stress set up.

The illustrated arrangement is the preferred form since metal in thin section withstands tension better than compression. The opposite arrangement, however, is intended to be within the bounds and spirit of this invention and for use in this type of reinforcement.

The strength provided in a particular box-like construction, as shown, is multiplied by the number of these rectangles provided. The reinforcement thus provided also withstands torsional stresses which may be set up by disalignment of the work during clamping. The latter result may be said to occur, first, from the relation of the diagonally disposed ribs preventing breaking down or deformation under directly applied load, and second, from their width, preventing twisting as well as collapsing of the box-like areas. The tendency, as torsional stresses are set up in the jaw, is to collapse the walls 10 and 11 of the jaw, this being prevented by the wide parallel ribs 12 inserted between the walls at a series of points.

Having thus described my invention, I claim:

1. An integrally formed clamping jaw, comprising, a mounting end, a laterally disposed work engaging face at the opposite end of said jaw, an inner wall and an outer wall of the same width as the general jaw thickness and converging to join to the work engaging end, a series of ribs joining said walls and disposed parallel to the line of direct thrusts imposed on the work engaging face, diagonally disposed ribs extending from opposite corners formed by the juncture of said parallel ribs and said walls, and webs disposed at right angles to said parallel ribs and said walls in the opposing corners from those joined by the diagonal ribs.

2. An integrally formed clamping jaw, comprising, a mounting end, a laterally disposed work engaging face at the opposite end, an inner wall and an outer wall joining said ends, a series of parallel ribs joining said walls, said ribs disposed in the direction of thrust imposed on the work engaging end, and diagonal ribs extending between opposing corners formed by the juncture of said parallel ribs and said walls.

3. An integrally formed clamping jaw, comprising, a mounting end, a laterally extending work engaging face at the opposite end, an inner wall and an outer wall converging to join said work engaging end, a series of parallel ribs joining said walls, said ribs disposed in the direction of thrust imposed on the work engaging end, and diagonal ribs extending from the lowermost corners at the work engaging side of the jaw formed by the juncture of ribs and walls to the opposing corner therefrom whereby said diagonal ribs tensionally take up the stresses created on the parallel ribs.

4. A clamping jaw structure, comprising, a slide bar engaging end, a work engaging end, an intermediate arm portion having an inner and outer wall, ribs joining said walls, said ribs disposed parallel to the work pressure applied to the outer work engaging end, and diagonally disposed ribs extending between the opposite corners formed by the juncture of ribs and inner and outer walls.

In witness whereof, I hereunto subscribe my name.

JOHN M. HARGRAVE.